April 3, 1951

E. H. LAND ET AL 2,547,763

METHOD OF STRETCHING CONTINUOUS MATERIALS
SUCH AS SHEETING AND THE LIKE

Filed Nov. 12, 1947

Edwin H. Land
and
William H. Ryan
INVENTORS

BY Donald L. Brown
and
Moncure G. Berg
Attorneys

April 3, 1951 E. H. LAND ET AL 2,547,763
METHOD OF STRETCHING CONTINUOUS MATERIALS
SUCH AS SHEETING AND THE LIKE
Filed Nov. 12, 1947 2 Sheets-Sheet 2

Edwin H. Land
and
William H. Ryan
INVENTORS

BY Donald L. Brown
and
Moncure B. Berg
Attorneys

Patented Apr. 3, 1951

2,547,763

UNITED STATES PATENT OFFICE 2,547,763

METHOD OF STRETCHING CONTINUOUS MATERIALS SUCH AS SHEETING AND THE LIKE

Edwin H. Land and William H. Ryan, Cambridge, Mass., assignors to Polaroid Corporation, Cambridge, Mass., a corporation of Delaware Application November 12, 1947, Serial No. 785,290

2 Claims. (Cl. 18—48)

This invention relates to the processing of continuous materials such as sheeting and the like and more particularly has reference to the stretching of such materials and especially to the longitudinal stretching thereof.

Objects of the invention are to provide methods for controllably stretching continuous sheet materials and the like by the continuous controlled application of opposed tensional forces which are applied to the material in a manner to restrain the material from narrowing; to provide continuous methods for stretching sheet materials and the like wherein the material is stretched longitudinally of itself and with the application of lateral forces thereto which are in the nature of a reaction force and which are developed on the application of opposed tensional stretching forces; and to provide methods of the character described which include the softening of the material during the application of opposed tensional stretching forces and especially the softening of materials thermoplastically by the application of heat thereto.

Other objects of the invention reside in novel processing procedures for stretching continuous materials such as sheets, sheeting, webs, ribbons, films, and the like, and especially long-chain, linear polymeric plastic materials of this character whereby to improve and/or change or vary the physical and/or optical properties and characteristics thereof.

Further objects of this invention concern the provision of methods for stretching continuous materials such as sheeting and the like by practices wherein the material is subjected to the action of a pair of tensional forces applied to act respectively in opposite directions and lengthwise of the material substantially uniformly thereacross, whereby to stretch the material, and while stretching the material, continuously drawing and moving the material lengthwise of itself by causing one of the applied tensional forces to be of greater magnitude than the other, and restraining the material from narrowing as it undergoes stretching by causing said tensional forces to be applied to act on the material at a distance apart adequate to develop a set of forces in the nature of reaction forces sufficient to maintain the width dimension of the material substantially unaltered from the width dimension possessed by the material prior to the stretching thereof and especially to methods of the character described wherein the longitudinal tensional stretching forces are applied by two sets of pressed-together rotating rolls which engage the material and which have the rolls of one set rotated at a greater peripheral speed than those of the other set whereby to continuously stretch and move the material longitudinally of itself.

Other objects of the invention will in part be obvious and will in part appear hereinafter.

The invention accordingly comprises the processes involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
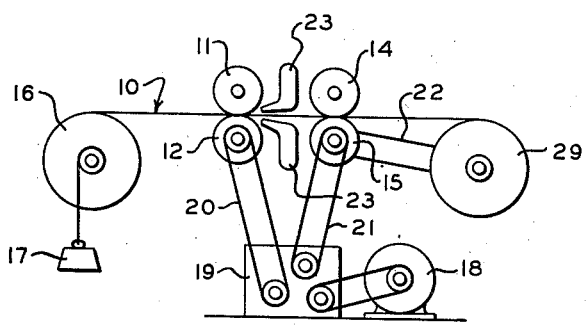
Figure 1 is a diagrammatic view in elevation of apparatus for carrying out the stretching practices of this invention.

It is known that the physical properties of many solid materials may be changed by stretching such materials. With certain materials, for example plastic materials, stretching may also effect a change in the optical properties thereof. In general, plastic sheet materials are stretched to change either their physical characteristics or their optical characteristics or both. The purpose for which stretching is intended may comprise increasing the tensile strength of a sheet material or increasing its area or increasing its length or decreasing its thickness or decreasing its width or various combinations of such purposes. If sheeting has a crystalline structure, stretching may be intended to orient the molecules thereof in order to render the material birefringent. In fact, increase in the tensile strength of a material having a crystalline structure by stretching such material may be ascribed to molecular orientation. Also stretching of sheeting which contains particles of other materials suspended therein may be employed for orienting these particles.

Stretching practices set forth herein may be utilized for the stretching of any continuous material. These practices are, however, particularly adapted and suited for the stretching of continuous plastic sheeting, which material provides an appropriate means for teaching the invention.

Plastic sheet materials which are hydrophilic as well as those which are substantially nonhydrophilic or are hydrophobic and which have long chain, substantially oriented molecules are useful for numerous purposes. For example, oriented plastic sheet materials may be employed in the formation of a variety of optical elements such as polarizers, filters, spectacle and goggle lenses, wave retardation elements and the like. In addition, birefringent and polarizing sheet materials are useful, for example, in the manufacture of automobile headlights and windshields. Also, suitable materials of this character may be used in photography in the formation of a light-polarizing sheet which serves as a support or carrier for a light-sensitive emulsion and in addition transparent, hydrophilic, molecularly oriented plastic material is well adapted for the formation or reproduction therein of light-polarizing images, designs, and the like. Besides optical and photographic use, plastic materials having the high tensile strength and pliability resulting from stretching are useful in a variety of other fields such as packaging, clothing, draperies and the like.

As a few examples of the many hydrophilic plastic sheet materials which may be processed by the methods hereinafter detailed, mention may be made of polyvinyl alcohol, the partially hydrolyzed polyvinyl acetals and polyvinyl alcohol esters, polyethylene, amylose, regenerated cellulose, suitably prepared polyamides or nylon-type plastics. Plastic materials of this character are high molecular weight, linear polymers which are capable of having their molecules oriented by stretching whereby these materials may be converted from an initial substantially isotropic condition to a condition wherein they display marked birefringence. Materials such as those just mentioned are characterized by their ability when in oriented condition to form a dichroic sorption complex with dichroic stains and dyes whereby the material is rendered light-polarizing.

As examples of the many nonhydrophilic or hydrophobic plastic materials which may be stretched in accordance with practices of this invention, mention may be made of cellulosic esters such as cellulose acetate and cellulose nitrate, cellulosic mixed esters such as cellulose actate butyrate or cellulose acetate propionate, certain vinyl compounds such as the vinyl acetate chloride copolymers, certain condensation type superpolymers such as suitably prepared polyamides or nylon-type plastics, as well as many other plastics of this character. The hydrophobic plastic materials just named are also high molecular weight linear polymers and may have their molecules oriented by suitable stretching practices.

The invention generally embraces all plastic materials having the properties ascribed to the specific plastics named by way of illustration.

When plastic materials are stretched to obtain maximum birefringence, molecular orientation and tensile strength, considerable loss takes place in the width of the material. In the case of the polyvinyl alcohol sheeting, this loss may be as much as 0.7 of the width of the unstretched material. In contrast, the present invention concerns stretching methods whereby sheet material and the like is stretched substantially without diminution of its width dimension but with increased length and decreased thickness taking place. By this invention, maximum attainable birefringence, molecular orientation and tensile strength are not obtained. Nevertheless, the degree of orientation and birefringence as well as tensile strength resulting from the treatment of sheet materials and the like in accordance with this invention is commercially satisfactory for many applications.

Stretching of materials in the form of sheets and the like is directional and orientation of the molecules of plastic materials occurs as an incident of the stretching of such materials. The angle between the stretch direction and the center line or longitudinal axis of continuous material such as sheeting and the like, will determine the stretch direction. Thus, longitudinal stretch is at 0° to the center line of the sheeting. The present invention is concerned solely with longitudinal stretching.

The term "material such as sheeting and the like" or similar expressions are generically used herein to include any materials in the form of sheets, sheeting, webs, ribbons, films, and foils, while the term "continuous" is intended to mean relatively long, unbroken or uninterrupted lengths of such sheeting and the like.

One prior art apparatus stretches material longitudinally by continuously drawing it through two spaced-apart roll sets, each set comprising at least two pressed-together rotatably mounted pressure rolls between which the material is gripped. Opposed tensional stretching forces are developed by rotation of the rolls at the output end of the apparatus at a greater peripheral speed than at the input end.

In the prior art however, no attempt has been made to control the application of the tensional stretching forces so that the effects of laterally acting forces, in the nature of reaction forces set up during the stretching process, are controlled to maintain the width dimension of the material being stretched in a condition substantially unaltered from that possessed by the material in unstretched condition.

Figure 2:
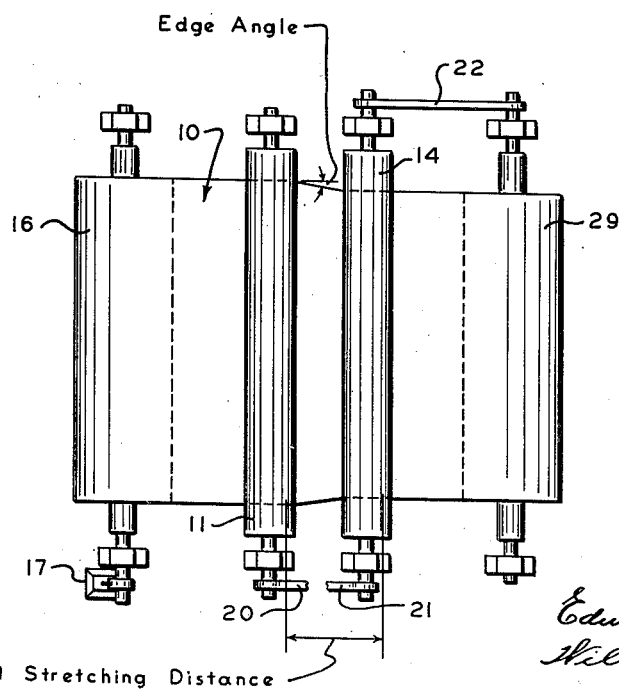
Fig. 2 is a diagrammatic view in plan of the apparatus of Fig. 1 with parts thereof omitted for the purpose of simplifying the drawing.

Apparatus making use of spaced-apart sets of pressure rolls may be conveniently employed in carrying out the improved practices of the present invention provided a geometry of stretcher layout is employed which makes it possible to stretch material while substantially restraining the narrowing thereof. Suitable apparatus with which the methods of this invention may be practiced is illustrated in Figs. 1 and 2 wherein sheet material 10 is shown undergoing stretch processing in stretching apparatus comprising a set of input rolls 11 and 12 located in close proximity to a set of output rolls 14 and 15. The input and output rolls are all of similar diameter and the rolls of each set are rotatably mounted in superposed relation in a suitable stand by conventional means which allow the upper rolls 11 and 14 of the respective roll sets to be releasably held in pressure contact with the corresponding lower rolls 12 and 15. In Figs. 1 and 2, the axes of the various rolls are parallel to each other in both horizontal and vertical planes although other arrangements may be employed. For example, one roll stand may be elevated with respect to the other roll stand. Likewise, similar but higher roll stands comprising three or more rolls may be employed.

A stock roll 16, which carries sheet material to be stretched, is mounted on the entry side of input rolls 11 and 12.

Sheet material from stock roll 16 is threaded between the input rolls 11 and 12 and the output rolls 14 and 15, preferably flat and with its longitudinal axis substantially at right angles to the roll axes. Conventional friction brake means 17 are associated with stock roll 16. The processed material is adapted to be wound on take-up roll 29.

The input rolls 11 and 12 are rotated at a lesser peripheral speed than the output rolls 14 and 15. One roll of each roll set is driven and all other rolls in each set are mounted for free rotation. Due to the pressure contact between the rolls in each set, each freely rotatable roll will be rotated at substantially the same peripheral speed as the driven roll in that set.

Means for driving the input and output rolls may comprise an electric motor 18 drivably connected to a power input shaft of a gear box 19 having a power take-off shaft, drivably connected by drive chain 20 to input roll 12, and another power take-off shaft connected by drive chain 21 to output roll 15, while the roll 15 is connected by chain 22 to take-up roll 29. The power take-off shafts of the gear box 19 are rotated at the speed differences needed to provide a desired speed ratio for the input and output rolls.

Softening of sheet material and the like facilitates its stretching and is generally desirable from the standpoint of rendering a material more ductile and readily deformable whereby to permit the extension thereof necessary to obtain high degree stretches. When relatively great extension is not required, softening may be dispensed with. Heat is an ideal medium for softening thermoplastic material.

Sheet material 10 is shown in Figs. 1 and 2 as being softened by the distribution of hot air over each surface thereof from similar ducts 23, one on each side of the path of travel of the material. Ducts 23 each have an elongated hollow body provided with a discharge orifice or slit 24 which is adapted to extend beyond the edge of the material being processed. Heated air is supplied to the ducts from a conventional source adapted to be connected to the ducts through suitable piping. To permit very close spacing between the input and output roll sets, the discharge end of each duct 23 is bent as shown so that the heated air is directed towards the discharge line of the input rolls 11 and 12 to concentrate thereon and consequently place the material in a readily deformable condition at a location close to the input rolls.

Stretched sheet material when soft has a tendency to shrink in length when relieved of stretching tension and consequently it is usual to set or harden the material before releasing the stretching tension. Cooling or chilling is effective for hardening thermoplastic material in a heated condition and considerable cooling occurs due to heat absorption by the output rolls 14 and 15. Additional cooling, if desired, may be effected by discharging cold air over the material between the output rolls and the take-up roll 29, or the material may be passed over and under a series of idler rolls located between the output rolls and the take-up roll.

Moisture remaining in plastic material after the stretching thereof may be removed by conventional heat treatment followed by hardening in the manner described.

Under the conditions illustrated, it will be apparent that sheet material or the like undergoing stretching will be continuously subjected to a pair of opposed and unequal tensional forces each of which is developed by the spaced-apart sets of rolls. These opposed tensional forces are unequal only to the extent necessary to physically move the material between the rolls. Each of these tensional forces is applied substantially uniformly across the material being stretched. In stretching operations as practiced herein, a tensional stretching force is progressively built up to reach a maximum value at some line of application which extends across the path of travel of the sheet material undergoing stretching.

Figure 4:
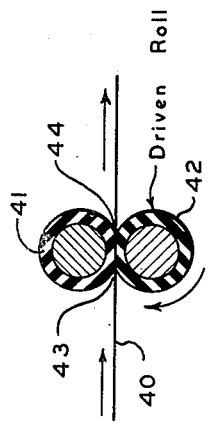
Fig. 4 is a diagrammatic view in elevation showing in enlarged scale a pair of rotating pressed-together rolls, similar to those of the apparatus of Figs. 1, 2 and 3, with sheet material in engagement between the rolls.

In the stretcher illustrated in Figs. 1 and 2, the input rolls 11 and 12 and the output rolls 14 and 15 are respectively in pressure contact whereby to grip the material being stretched. As shown in the drawings the rolls 11, 12, 14 and 15 comprise a metal core encased in a rubber sheath. Alternately each input and output roll may be formed entirely of a suitable rubber or rubber compound. Pressure applied to a roll pair of the character described deforms the surfaces of the rolls where they are in contact by causing such surfaces to flatten. This condition, in somewhat exaggerated form, is shown schematically in Fig. 4 where two rolls 41 and 42, similar to the input rolls 11 and 12 or output rolls 14 and 15, are disclosed in contact under operating pressure and as feeding sheet material 40 therebetween from left to right. With such a roll mounting and construction it will be apparent that the contacting areas of the roll surfaces will assume a generally rectangular shape. By this arrangement, the sheet material 40 passing between the rolls 41 and 42 will first be subjected to tensional force where it enters the roll pair along the entering edge of the contacting surface areas of the rolls which is indicated at 43, and this tensional force will reach its maximum along the discharging edge or line of the contacting surfaces which is indicated at 44.

For example in the case of a roll set comprising any number of pressed-together rolls, the magnitude of the tensional force applied by the rolls will progressively increase from the line of entry of the material into contact with the pair of rolls between which it enters the roll set to a maximum along the line of discharge where the material has its last contact with the pair of rolls from which it is discharged from the roll set. Thus, the maximum tensional force applied by a roll set to the material passing therethrough will always occur at the line of contact where the material leaves the roll set and this condition will hold for other tension-producing devices such as those hereinafter mentioned.

In understanding the present invention it is desirable to consider that on a continuous stretching machine, assuming that the volume of sheet material entering the machine per unit time substantially equals the volume of sheet material discharging from the machine per unit time, $$V_1 = V_2 \quad (1)$$

also, $$L_1 \times W_1 \times T_1 = V_1 \quad (2)$$

and $$L_2 \times W_2 \times T_2 = V_2 \quad (3)$$

where V represents volume; L, length; W, width; and T, thickness; and the subscripts 1 and 2 indicate, respectively, sheet material entering the stretcher and the same sheet material as it is discharged from the machine after stretching.

The proportions between $L_1$ and $L_2$, $W_1$ and $W_2$, and $T_1$ and $T_2$ will vary in accordance with the stretcher layout. This may be illustrated by comparing two types of stretching, "pure stretch" and that type with which this invention is concerned, namely, "wide stretch."

Pure stretch comprehends the longitudinal stretching of sheet material and the like with substantially no lateral force applied thereto during stretching, whereby narrowing and thinning of the material is substantially unrestrained. Under these conditions, $L_2 > L_1$; $W_2 < W_1$; and $T_2 < T_1$.

In pure stretch, assuming that unstretched and unoriented sheet material is being worked upon $$\frac{W_2}{W_1} = \frac{T_2}{T_1} \quad (4)$$

The ratio set forth in Equation 4 assumes the absence of any lateral force applied to the sheeting as it is undergoing stretching and represents the conditions which it is endeavored to carry out in pure stretch operations.

The present invention is concerned with "wide stretch," a term which is intended to comprehend the longitudinal stretching of sheet material and the like while intentionally restraining the material from narrowing during stretching by the application thereto of lateral forces of sufficient magnitude to maintain the width $W_2$ after stretching as closely equal as possible to the width $W_1$ before stretching. Under circumstances of wide stretch:

$$\frac{W_2}{W_1} \pm \frac{T_2}{T_1} \quad (5)$$

Between wide and pure stretch conditions it is possible to have an intermediate condition.

Generally speaking, the degree of molecular orientation and birefringence of plastic sheet material becomes greater with increased elongation of the sheet material and the ratio of the length of the stretched sheet material to the length of the unstretched sheet material will give some indication of the degree of orientation and birefringence. However, this length ratio fails to take into account the situation wherein sheet materials of similar width are stretched to the same length but to different widths.

A more conclusive expression for indicating orientation and birefringence is offered in the axial ratio which is obtained by comparing the major and minor axes of an ellipse appearing on longitudinally stretched sheet material and derived, as a result of stretching the material, from a unit circle marked on the material in its unstretched condition. The major axis of such an ellipse will lie in a direction parallel to the stretch direction and if the length of the major axis be considered as $l_2$ and that of the minor axis is $w_2$, the axial ratio will be $l_2/w_2$. Hence, it will appear that the axial ratio imparted to identical materials extended to the same elongation will be of greater magnitude under pure stretch practices than under wide stretch practices.

Within limits to be noted, axial ratio is directly related to birefringence and dichroism of optically active stretched material and offers an acceptably accurate measurement for stretching results.

Another expression useful, in a manner which will presently appear, is the width ratio, that is the value of $W_2/W_1$.

With regard to the distinctions between pure stretch and wide stretch and as will hereinafter be disclosed, the greater the distance between the lines of application of the stretching tensional forces, the less will be the effects of lateral reaction forces acting upon the sheet material whereby to restrain it from narrowing. Pure stretch conditions therefore require a relatively great or long roll spacing. As a generalization made with regard to sheet materials, pure stretch practices are carried out with a roll separation or spacing of many times the width of the unstretched sheet while wide stretch procedures are carried out with a roll spacing which is less than the width of the unstretched sheet and preferably only a small fraction thereof.

Figure 3:
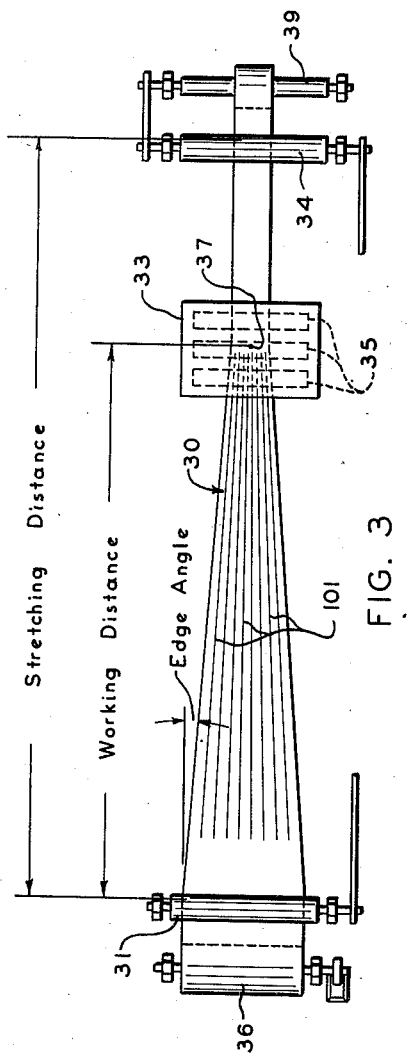
Fig. 3 is a diagrammatic view in plan, with parts omitted, of stretching apparatus which permits different stretching practices to be carried out than those practiced with the apparatus of Figs. 1 and 2 and, while not forming a part of the present invention, is useful for the purpose of illustration to assist in teaching the methods to be hereinafter set forth and claimed.
Figure 5:
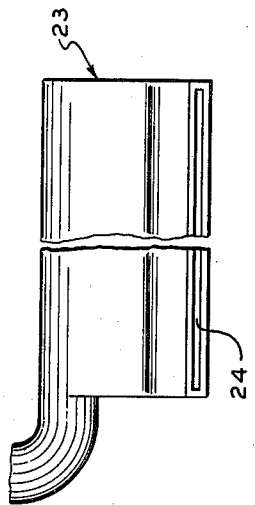
Fig. 5 is a detailed front elevation of a heating duct employed with the apparatus of Figs. 1 and 2.

Apparatus suitable for carrying out pure stretch practices is disclosed diagrammatically in Fig. 3 as making use of widely spaced-apart input and output roll sets 31 and 34, each comprising a pair of pressed-together rolls similar to those in the stretcher of Figs. 1 and 2. Sheet material 30, from a stock roll 36 is shown in Fig. 3 as undergoing stretching and with the processed material being wound upon a take-up roll 39. The stretching apparatus of Fig. 3 is adapted to be driven by means which are not illustrated but which are similar to the means disclosed for actuating the machine of Figs. 1 and 2.

Sheet material 30 is shown in Fig. 3 as being drawn through a still air oven 33 which is of boxlike character and which is provided with entry and exit ports. Oven 33 is employed to soften the material and is located between the input rolls 31 and the output rolls 34. Oven 33 may be heated by electrical strip heaters 35 positioned in the oven as shown. Conventional means may be employed for controlling oven heat.

The softening zone provided by the oven 33 or other softening means used in pure stretch practices for placing unsoftened material in a readily deformable condition during the stretching operation is predeterminedly located between the lines of application of the opposed tensional stretching forces at a distance therebetween which is selected so that substantially all deformation of the material occurs within the softening zone whereby the material reaches its narrowest width therein. In pure stretch, the width of the material after deformation in the softening zone is substantially constant from the position in its path of travel where it reaches its narrowest width to the discharge of the output rolls and in Fig. 3, this position of narrowest width is shown as within the oven 33 and is indicated at 37.

In pure stretch operations longitudinal folds appear in unsoftened sheet material during the stretching process to extend from near the input rolls to a position within the softening zone and are shown by lines 101. A cross section of the sheet material through folds 101 has the appearance of a continuous wave of approximately equal amplitudes. As the sheet material becomes increasingly softened by movement into the softening zone these folds begin to flatten out and disappear. In wide stretch operations, the opposed tensional stretching forces are applied so closely together that the material being stretched is maintained substantially flat as shown in Fig. 2.

Sheet material as it undergoes stretching by the application of opposed tensional forces tends to reach the narrowest possible width consistent with the magnitude of the tensional forces involved and also with the physical characteristics of the material. Forces internal of the material are set up as the material is stretched and it is these forces that act to narrow the material. These narrowing forces are directed laterally across the material and endeavor to pull the edges thereof inwardly and towards its center. The input rolls or other tension-applying means at the input end of the apparatus set up reaction forces along the discharge line thereof which oppose the internal forces within the material tending to effect its narrowing. The reaction forces created by the input rolls or other device act laterally of the material and from the center outwardly towards each edge thereof and consequently endeavor to restrain narrowing of the sheet material or the like as it undergoes stretching.

The effects of the reaction forces which restrain narrowing diminish with increase of the distance from their position or line of application. By the present invention, deformation of the material is caused to take place over a region or zone wherein the lateral reaction forces are effective to restrain the natural tendency of the material to narrow as it is stretched longitudinally. On the contrary, in pure stretch practices the region of deformation of the material is removed from the line of application of the lateral forces which restrain narrowing by a distance sufficient to reduce the effect of such forces to a negligibly small amount.

With reference to the stretchers of Figs. 1, 2 and 3, it may be observed that the edge of the sheet material after it leaves the input or slow rolls makes an angle with its center line. This angle is termed the "edge angle" and it will become apparent that its magnitude is dependent upon the narrowing of the sheet material. However, to simplify the drawing, the edge angle has been shown as the angle between the edge of the sheet material approaching and leaving the input rolls.

The lateral forces which endeavor to restrain narrowing of the sheet material are functions of the edge angle. Reduction of the edge angle results in reducing these lateral restraining forces. In theory, if the edge angle is reduced to zero then there would be no lateral forces applied to the sheet material to restrain it from narrowing. It will be apparent from the geometry of stretcher layout that decrease in edge angle results upon increase in the distance between the position in the path of travel of the material where it reaches its narrowest width and the input rolls. In theory, if this distance were infinite, the edge angle would equal zero.

When sheet material initially in an unsoftened condition is subjected to softening during its stretch processing, the softening area of the stretching apparatus may be defined as the region or zone in the path of travel of the sheet material through the stretcher in which the sheet material is maintained in a softened condition. The location within the softening zone where the sheet material undergoing stretching becomes readily deformable may be called the release position. In instances where sheet is processed without softening treatment during stretching, there would be no softening region in the stretching apparatus and the release position would be at the discharge of the input rolls.

In the case of wide stretch, the opposed tensional stretching forces are applied so closely together that lateral reaction forces which restrain narrowing of the material are effective for substantially the full distance between the lines of application of the tensional stretching forces so that even though the material is caused to release or is rendered deformable at a position in its path of travel before reaching the line of application of the greater tensional force, its narrowest width will be attained at this line of application. For this reason wide stretch practices cause the material to reach its narrowest width at the discharge of the output rolls regardless of the condition of the material at the time that it is subjected to stretching.

In the case of pure stretch, the opposed tensional stretching forces are applied sufficiently far apart with respect to each other so that the effects of the lateral reaction forces which restrain narrowing are substantially negligible at the material attains its narrowest width.

It is more convenient, in the treatment of controlled stretching, to deal with the distance between the line of application of the lesser tensional stretching force and the location in the path of material undergoing stretching where the material reaches its narrowest width rather than the location of the release position from said line.

The distance may be termed the "working distance" and to be considered with it is a distance which may be called the "stretching distance" and which may be defined as the spacing or distance apart of the lines of application of the opposed tensional stretching forces since it is at these locations that the forces which cause longitudinal stretching are applied to act.

Generally speaking, the working distance will be less than the stretching distance in pure stretch operations wherein initially unsoftened material is rendered readily deformable during the stretching operation. This condition is illustrated in the apparatus of Fig. 3. When pure stretch operations are carried out on presoftened material or on material which is stretched in unsoftened condition, the working distance and the stretching distance of the apparatus will be substantially equal as is also the case in all wide stretch operations.

While in theory pure stretch calls for an infinite working distance, results giving a very close approximation of the theoretical ideal have been obtained with a working distance within the practical limit, set empirically as seventy times the width of the material in unstretched condition. Also excellent pure stretch results may be obtained at working distances which are considerably reduced from this empirical value. For example, with a stretcher layout using a working distance of 140 inches, unplasticized and substantially unoriented and isotropic polyvinyl alcohol sheeting having an unstretched width of two inches and a thickness of 0.005 inch may be readily stretched to about eight times its length to give an axial ratio of about 27 and a width ratio ($W_2/W_1$) of about 0.3. Similar polyvinyl alcohol sheeting, differing from that described only by having an unstretched width dimension of thirty inches, has been stretched while using a working distance of 140 inches to give an axial ratio of about 24 and a width ratio of about 0.375 at an elongation of about eight times its original length. It is possible to stretch polyvinyl alcohol sheeting of similar character to about 9.5 times its length. At this higher stretch, an axial ratio of about 30 has been obtained under pure stretch practices.

In wide stretch, mechanical feasibility restricts the shortness of the stretching and working distance employed. Theoretically, if the positions of the input and output rolls of stretching apparatus could be made to coincide, stretching with complete restraint of width could be obtained. Under such circumstances, assuming appropriate softening conditions for plastic material being stretched, an axial ratio approximating the extension of the material would be obtained.

One embodiment of apparatus suitable for carrying out wide stretch has been employed heating means, equivalent to those shown in Figs. 1 and 2 for softening purposes, and has made use of 3-inch diameter rolls arranged in sets which are spaced apart at 3⅝ inches from center to center. With a stretcher layout of the character just noted, unplasticized and substantially unoriented and isotropic polyvinyl alcohol sheeting of various thicknesses ranging from 0.001 inch to 0.005 inch and of various widths from several inches up to 30 inches has been readily stretched to give an axial ratio of from about 3½ to 5 and a width ratio of about 0.9 when extended from about 4 to 5 times its unstretched lengh. It is possible with a stretcher of this character to obtain an axial ratio of around 9 for unplasticized and substantially unoriented and isotropic polyvinyl alcohol sheet, at least with relatively wide material such as 20-inch to 30-inch sheeting, but higher axial ratios are in general restricted by the elastic limit of the sheeting.

In a further stretcher layout substantially like that described but using a distance between roll centers of 10⅝ inches, wide stretch results comparable with those mentioned in the just-foregoing have been obtained for similar widths of unplasticized and substantially unoriented and isotropic polyvinyl alcohol sheeting.

With unstretched sheet material having a relatively wide width, for example 30 inches, it will be apparent that the conditions necessary for wide stretch will be provided when using a roll spacing which approaches zero. In general, the minimum roll separation within practical limits is about 3⅝ inches from center to center as heretofore indicated. It will also be apparent that the pure stretch conditions will be approached in wide stretch apparatus when the width dimension of unstretched sheet subjected to processing approaches zero and some indication thereof may be obtained by the statement that in general pure stretch conditions are dominant when a relation exists between sheet width and roll separaion which bears a ratio of the order of from 1 to 5 to ∞. On the other hand, wide stretch conditions are generally dominant in instances when this ratio is of an order of about 5 and greater to 1.

Lateral forces which are set up during the stretching of material and which endeavor to restrain it from narrowing are not uniform in magnitude across the material. Consequently, the axial ratio will vary across sheet material being processed by wide stretch practices so that the magnitude of the axial ratio increases outwardly from the center of the material towards its edges where the greatest narrowing of the material takes place.

On the other hand, substantially uniform conditions will exist laterally of sheet material which is stretched under pure stretch practices.

In wide stretch, the edge area at each side of the sheet where the higher axial ratios are present will range in width from about 1 inch to about 3 inches while the axial ratio over the remainder of the width of the material may for practical purposes be treated as at least roughly uniform. Generally speaking, the width of these edge effects is related to the overall width of the unstretched material and also to the roll separation employed with the stretching apparatus. At a given roll separation, the width of the edge areas wherein high axial ratios are present may be expected to increase with increase in the overall width of the unstretched material. On the other hand, with a fixed width of unstretched sheet material, the width of the edge areas may be expected to decrease with increase in the separation of the input and output rolls.

It is customary to cut sheet material which has been subjected to wide stretch processing by removing the edge areas wherein the higher axial ratios occur. This leaves stretched sheet material having an axial ratio which, for general commercial purposes, is sufficiently uniform across the full width of the cut-down material. In this regard, if in wide stretch processing, 30-inch sheet narrows by 3 inches and if nonuniform edge areas each 3 inches wide are cut away, the width of the final product will be 21 inches. On the other hand, if this 30-inch material is processed under pure stretch practices to give a width ratio of 0.3, the width of the final product will be 9 inches.

Stretcher design will be dependent on an interbalancing of various related factors. For example, the temperature range to be used in stretching plastic materials is relatively wide but will be influenced by the width and thickness of the material, the length of the softening zone, the speed of movement of the material and the like. Thus, the rate of movement of the material will influence the length of the softening zone while thick sheet requires stretch temperatures and/or a longer softening zone, and so on.

When heat is used for softening purposes and stretching is carried out to increase orientation and birefringence, the lower temperature limit is determined by the point at which the particular material breaks or blushes for the specific stretching forces employed while the upper limit is determined by the temperature needed to cause the material to reach a rubber-elastic state just short of flow and below the point where it becomes permanently deformed when stretched. In stretching polyvinyl alcohol to improve or increase orientation or birefringence, stretch temperatures between 150° F. and 400° F. have been successfully employed. When stretching is employed solely to alter the dimensions of the material, the upper temperature employed is the melting point of the material.

While pressed-together rotating rolls are an excellent means for applying the opposed tensional stretching forces, other mechanical expedients fall within the scope of the invention.

For example, the input roll stand can be dispensed with and the stock roll may be suitably braked.

Further, roll stands of Figs. 1 and 2 may be converted to a friction drive type of device by maintaining the rolls out of contact with each other and by partially passing the material around each roll. If a sufficient number of rolls is employed in the roll stand sufficient frictional contact is provided to develop the desired tensional stretching force.

It is also possible to employ two pressed-together flat surface for developing the lesser stretching force of the pair of opposed tensional forces. For example, the input rolls 11 and 12 may be locked against rotation while maintaining them in pressure contact and drawing the material between them.

Swelling by passing the material through a bath containing a suitable swelling agent or solvent is another method employed for softening plastic sheet materials. An aqueous solution of a salt, for example sodium chloride or sodium sulfate, may be used for swelling polyvinyl alcohol. Mention may be made of ethyl acetate for swelling cellulose acetate. The liquid employed for softening may be removed after stretching by washing or drying the material.

The use of heat is the most usual procedure for softening the plastic materials mentioned herein and besides, the use of hot air has been carried out with a hot liquid which is substantially inert to the material, and by exposing the material to infrared or to radio-frequency radiation.

While in wide stretch processing, axial ratios greater than 10 are obtainable for unplasticized material, generally speaking, they are possible only when the material has been softened sufficiently so that it reaches a condition generally termed "thermoplastic" wherein it is subject to flow and becomes permanently deformed when stretched. However, when a material is stretched in a condition wherein it is softer than the preferred rubber-elastic state, it has been found that increased birefringence and orientation of the molecules are substantially negligible. It is believed to be for this reason that axial ratios of about 10 indicate the optimum birefringence and orientation obtainable for unplasticized polyvinyl alcohol when processed under wide stretch practices. In pure stretch, however, this optimum is indicated for unplasticized polyvinyl alcohol at an axial ratio of about 30. Since polyvinyl alcohol is representative of plastic materials now known to have the highest degree of extensibility, an axial ratio of 10, at least at the present time, may generally be treated as indicative of the highest state of birefringence and orientation obtainable by wide stretch processing for any unplasticized material.

Addition of a plasticizer to a plastic material may be suitably utilized to increase the extensibility of the material. Throughout the specification, discussions concerning the extensibility of the material and references to related properties and factors dependent upon extensibility have, however, been limited to unplasticized materials. Hence, it will be appreciated that when dealing with plasticized materials, stretching results will be varied from those specifically noted.

Sheet material is preferably stretched in a flat or spread-out condition and is moved when stretched with its longitudinal axis substantially at right angles to the input and output rolls. The concept of this invention will be satisfied however, even though the sheet material may be folded, wrinkled, or creased.

Substantially all sheet materials, webs, ribbons, films, foils, and the like possess some extensibility. While the amount by which such materials may be extended is increased when they are in a softened condition, it is to be understood that the practices of the present invention are intended to cover operations wherein stretching is effected without softening.

Since certain changes may be made in the above processes without departing from the scope of the invention herein involved, it is intended that all matter contained in the above description or shown in the accompanying drawings shall be interpreted as illustrative and not in a limiting sense.

What is claimed is:

1. A method of stretching continuous material such as extensible organic plastic sheeting and the like while materially restraining the narrowing of the material, comprising subjecting the material to the simultaneous action of a pair of opposed and unequal tensional forces applied to act lengthwise of the material and substantially uniformly thereacross at spaced-apart locations with respect to each other whereby to draw and move the material lengthwise of itself while applying a longitudinal stress to the material which lengthens and thins the material and tends to narrow it, and restraining the material from narrowing by applying said tensional forces closely adjacent each other and at a distance apart at least not greater than one-fifth of the width dimension possessed by the material prior to being subjected to said stretching.

2. The method of stretching a continuous organic thermoplastic material such as sheeting and the like comprising engaging the material between a set of pressed-together rotating rolls to feed the material lengthwise of itself, continuing the lengthwise movement of the material without interruption by drawing the material under tension through a second set of pressed-together rolls which engage the material but which are rotated at a greater peripheral speed than that of the first-mentioned set of rolls and which are separated from the first-mentioned set of rolls by a distance which is less than the width possessed by the material prior to being subjected to said stretch processing, heating the material as it moves between said roll sets and rendering it readily deformable closely adjacent the discharge line of the first-mentioned set of rolls, cooling the material and releasing it from tension.

EDWIN H. LAND.
WILLIAM H. RYAN.

REFERENCES CITED

The following references are of record in the file of this patent:

UNITED STATES PATENTS

| Number | Name | Date |
| --- | --- | --- |
| 2,067,025 | Schmidt | Jan. 5, 1937 |
| 2,175,125 | Mack et al. | Oct. 3, 1939 |
| 2,301,222 | Minich | Nov. 10, 1942 |
| 2,328,843 | Osterhof | Sept. 7, 1943 |
| 2,335,190 | Minich | Nov. 23, 1943 |
| 2,373,215 | Young | Apr. 10, 1945 |
| 2,490,781 | Cloud | Dec. 13, 1949 |